(12) United States Patent
Cho et al.

(10) Patent No.: US 11,503,316 B2
(45) Date of Patent: Nov. 15, 2022

(54) IMAGE ENCODING/DECODING METHOD AND DEVICE, AND RECORDING MEDIUM IN WHICH BITSTREAM IS STORED

(71) Applicant: RESEARCH & BUSINESS FOUNDATION SUNGKYUNKWAN UNIVERSITY, Suwon-si (KR)

(72) Inventors: Seung Hyun Cho, Daejeon (KR); Jung Won Kang, Daejeon (KR); Hyun Suk Ko, Daejeon (KR); Sung Chang Lim, Daejeon (KR); Jin Ho Mes Lee, Daejeon (KR); Ha Hyun Lee, Seoul (KR); Dong San Jun, Daejeon (KR); Hui Yong Kim, Daejeon (KR); Byeung Woo Jeon, Seongnam-si (KR); Nam Uk Kim, Suwon-si (KR); Seung Su Jeon, Suwon-si (KR); Jin Soo Choi, Daejeon (KR)

(73) Assignee: RESEARCH & BUSINESS FOUNDATION SUNGKYUNKWAN UNIVERSITY, Gyeonggi-Do (KR)

( * ) Notice: Subject to any disclaimer, the term of this patent is extended or adjusted under 35 U.S.C. 154(b) by 0 days.

(21) Appl. No.: 17/096,952

(22) Filed: Nov. 13, 2020

(65) Prior Publication Data
US 2021/0067794 A1     Mar. 4, 2021

Related U.S. Application Data

(63) Continuation of application No. 16/464,934, filed as application No. PCT/KR2017/013606 on Nov. 27, 2017, now Pat. No. 10,869,049.

(30) Foreign Application Priority Data

Nov. 29, 2016 (KR) .................. 10-2016-0159884

(51) Int. Cl.
H04N 19/44  (2014.01)
H04N 19/159 (2014.01)
H04N 19/176 (2014.01)

(52) U.S. Cl.
CPC .......... H04N 19/44 (2014.11); H04N 19/159 (2014.11); H04N 19/176 (2014.11)

(58) Field of Classification Search
CPC .... H04N 19/119; H04N 19/50; H04N 19/159; H04N 19/129; H04N 19/186;
(Continued)

(56) References Cited

U.S. PATENT DOCUMENTS 10,142,627 B2  11/2018  Zhao et al.
10,390,023 B2   8/2019  Lim et al.
(Continued)

FOREIGN PATENT DOCUMENTS

JP    2013-34163 A    2/2013
JP    2013-141187 A   7/2013
(Continued)

OTHER PUBLICATIONS

F. Kamisli, "Intra prediction based on statistical modeling of images", Visual Communications and Image Processing, 2012, pp. 1-6, DOI: 10.1109/VCIP.2012.6410803.
(Continued)

*Primary Examiner* — Neil R Mikeska
(74) *Attorney, Agent, or Firm* — Cantor Colburn LLP

(57) ABSTRACT

The present invention relates to an image encoding/decoding method and device. The image decoding method according to the present invention comprises the steps of: decoding a prediction mode index; determining whether the prediction mode index indicates function-based intra prediction; inducing a parameter(s) for generating a function, when the prediction mode index indicates the function-based intra (Continued)

prediction; generating the function on the basis of the induced parameter(s); and performing intra prediction by using the generated function.

14 Claims, 10 Drawing Sheets

(58) Field of Classification Search
CPC ........ H04N 19/91; H04N 19/44; H04N 19/11; H04N 19/86; H04N 19/176; H04N 19/96; H04N 19/13
See application file for complete search history.

(56) References Cited

U.S. PATENT DOCUMENTS

| | | | |
|---|---|---|---|
| 2012/0082223 A1 | 4/2012 | Karczewicz et al. | |
| 2013/0022115 A1 | 1/2013 | Oh | |
| 2013/0101043 A1 | 4/2013 | Miyahara et al. | |
| 2013/0114713 A1* | 5/2013 | Bossen | H04N 19/11 375/240.12 |
| 2013/0194384 A1* | 8/2013 | Hannuksela | H04N 19/50 348/43 |
| 2013/0287312 A1* | 10/2013 | Minezawa | H04N 19/61 382/233 |
| 2014/0126635 A1 | 5/2014 | Zheludkov et al. | |
| 2014/0168362 A1 | 6/2014 | Hannuksela et al. | |
| 2015/0195566 A1 | 7/2015 | Hinz et al. | |
| 2016/0044310 A1 | 2/2016 | Park et al. | |
| 2016/0381385 A1* | 12/2016 | Ugur | H04N 19/117 375/240.12 |
| 2017/0041602 A1 | 2/2017 | Oh et al. | |

FOREIGN PATENT DOCUMENTS

| | | |
|---|---|---|
| KR | 10-2015-0005826 A | 1/2015 |
| WO | 2019/009540 A1 | 1/2019 |

OTHER PUBLICATIONS

Shohei Matsuo et al., "Weighted intra prediction", 33rd VCEG Meeting, Oct. 20, 2007, Shenzhen, China, 4 pages, Document No. VCEG-AG18, XP030003622.
Ugur Kemal et al., "Description of video coding technology proposal by Tandberg, Nokia, Ericsson", 1st JCT-VC Meeting; Apr. 15-23, 2010, 33 pages, Dresden, DE, URL: HTTP://WFTP3.ITU.INT/AV-ARCH/JCTVC-SITE/, Document No. JCTVC-A 119.
The extended European search report for EP Application No. 17876057.5 dated Mar. 30, 2020, citing the above reference(s).
Seungsu Jeon, "Function Based Intra Prediction", Master's thesis. Department of Electrical and Computer Engineering, Sungkyunkwan University, Aug. 2017, English abstract.
International Search Report dated Mar. 2, 2018 for PCT/KR2017/013606, citing the above references.
Japanese Office Action for JP Application No. 2019-528700 dated Dec. 14, 2021, citing the above reference (s).
Japanese Office Action for JP Application No. 2019-528700 dated Jul. 19, 2022.

* cited by examiner

FIG. 5

| Idx | function | parameter group 1 | parameter group 2 |
|---|---|---|---|
| 0 | normal function distribution | $\mu_h, \mu_v, \sigma_h, \sigma_v$ | . |
| 1 | | $\mu_h, \mu_v$ | $\sigma_h, \sigma_v$ |
| 2 | | $\sigma_h, \sigma_v$ | $\mu_h, \mu_v$ |
| 3 | | $\mu_h, \sigma_h$ | $\mu_v, \sigma_v$ |
| 4 | | $\mu_v, \sigma_v$ | $\mu_h, \sigma_h$ |
| 5 | | $\mu_h, \sigma_v$ | $\mu_v, \sigma_h$ |
| 6 | | $\mu_v, \sigma_h$ | $\mu_h, \sigma_v$ |
| 7 | | . | $\mu_h, \mu_v, \sigma_h, \sigma_v$ |
| 8 | Laplacian function distribution | $\mu_h, \mu_v, \sigma_h, \sigma_v$ | . |
| 9 | | $\mu_h, \mu_v$ | $\sigma_h, \sigma_v$ |
| 10 | | $\sigma_h, \sigma_v$ | $\mu_h, \mu_v$ |
| 11 | | $\mu_h, \sigma_h$ | $\mu_v, \sigma_v$ |
| 12 | | $\mu_v, \sigma_v$ | $\mu_h, \sigma_h$ |
| 13 | | $\mu_h, \sigma_v$ | $\mu_v, \sigma_h$ |
| 14 | | $\mu_v, \sigma_h$ | $\mu_h, \sigma_v$ |
| 15 | | . | $\mu_h, \mu_v, \sigma_h, \sigma_v$ |
| 16 | cosine function distribution | $a_h, a_v, \theta_h, \theta_v$ | . |
| 17 | | $a_h, a_v$ | $\theta_h, \theta_v$ |
| 18 | | $\theta_h, \theta_v$ | $a_h, a_v$ |
| 19 | | $a_h, \theta_h$ | $a_v, \theta_v$ |
| 20 | | $a_v, \theta_v$ | $a_h, \theta_h$ |
| 21 | | $a_h, \theta_v$ | $a_v, \theta_h$ |
| 22 | | $a_v, \theta_h$ | $a_h, \theta_v$ |
| 23 | | . | $a_h, a_v, \theta_h, \theta_v$ |
| 24 | beta function distribution | $\alpha_h, \alpha_v, \beta_h, \beta_v$ | . |
| 25 | | $\alpha_h, \alpha_v$ | $\beta_h, \beta_v$ |
| 26 | | $\beta_h, \beta_v$ | $\alpha_h, \alpha_v$ |
| 27 | | $\alpha_h, \beta_h$ | $\alpha_v, \beta_v$ |
| 28 | | $\alpha_v, \beta_v$ | $\alpha_h, \beta_h$ |
| 29 | | $\alpha_h, \beta_v$ | $\alpha_v, \beta_h$ |
| 30 | | $\alpha_v, \beta_h$ | $\alpha_h, \beta_v$ |
| 31 | | . | $\alpha_h, \alpha_v, \beta_h, \beta_v$ |
| 32 | exponential function distribution | $\lambda_h, \lambda_v$ | . |
| 33 | | $\lambda_h$ | $\lambda_v$ |
| 34 | | $\lambda_v$ | $\lambda_h$ |
| 35 | | . | $\lambda_h, \lambda_v$ |

FIG. 6

| Idx | function | parameter group 1 | parameter group 2 | Idx | function | parameter group 1 | parameter group 2 |
|---|---|---|---|---|---|---|---|
| 0 | Planar prediction mode | | | 51 | | $a_h, a_v, \theta_h, \theta_v$ | . |
| 1 | DC prediction mode | | | 52 | | $a_h, a_v$ | $\theta_h, \theta_v$ |
| 2~34 | Angular prediction mode | | | 53 | cosine function distribution | $\theta_h, \theta_v$ | $a_h, a_v$ |
| | | | | 54 | | $a_h, \theta_h$ | $a_v, \theta_v$ |
| 35 | normal function distribution | $\mu_h, \mu_v, \sigma_h, \sigma_v$ | . | 55 | | $a_v, \theta_v$ | $a_h, \theta_h$ |
| 36 | | $\mu_h, \mu_v$ | $\sigma_h, \sigma_v$ | 56 | | $a_h, \theta_v$ | $a_v, \theta_h$ |
| 37 | | $\sigma_h, \sigma_v$ | $\mu_h, \mu_v$ | 57 | | $a_v, \theta_h$ | $a_h, \theta_v$ |
| 38 | | $\mu_h, \sigma_h$ | $\mu_v, \sigma_v$ | 58 | | . | $a_h, a_v, \theta_h, \theta_v$ |
| 39 | | $\mu_v, \sigma_v$ | $\mu_h, \sigma_h$ | 59 | beta function distribution | $a_h, a_v, \beta_h, \beta_v$ | . |
| 40 | | $\mu_h, \sigma_v$ | $\mu_v, \sigma_h$ | 60 | | $a_h, a_v$ | $\beta_h, \beta_v$ |
| 41 | | $\mu_v, \sigma_h$ | $\mu_h, \sigma_v$ | 61 | | $\beta_h, \beta_v$ | $a_h, a_v$ |
| 42 | | . | $\mu_h, \mu_v, \sigma_h, \sigma_v$ | 62 | | $a_h, \beta_h$ | $a_v, \beta_v$ |
| 43 | Laplacian function distribution | $\mu_h, \mu_v, \sigma_h, \sigma_v$ | . | 63 | | $a_v, \beta_v$ | $a_h, \beta_h$ |
| 44 | | $\mu_h, \mu_v$ | $\sigma_h, \sigma_v$ | 64 | | $\sigma_h, \beta_v$ | $a_v, \beta_h$ |
| 45 | | $\sigma_h, \sigma_v$ | $\mu_h, \mu_v$ | 65 | | $a_v, \beta_h$ | $a_h, \beta_v$ |
| 46 | | $\mu_h, \sigma_h$ | $\mu_v, \sigma_v$ | 66 | | . | $a_h, a_v, \beta_h, \beta_v$ |
| 47 | | $\mu_v, \sigma_v$ | $\mu_h, \sigma_h$ | 67 | exponential function distribution | $\lambda_h, \lambda_v$ | . |
| 48 | | $\mu_h, \sigma_v$ | $\mu_v, \sigma_h$ | 68 | | $\lambda_h$ | $\lambda_v$ |
| 49 | | $\mu_v, \sigma_h$ | $\mu_h, \sigma_v$ | 69 | | $\lambda_v$ | $\lambda_h$ |
| 50 | | . | $\mu_h, \mu_v, \sigma_h, \sigma_v$ | 70 | | . | $\lambda_h, \lambda_v$ |

IMAGE ENCODING/DECODING METHOD AND DEVICE, AND RECORDING MEDIUM IN WHICH BITSTREAM IS STORED

TECHNICAL FIELD

The present invention relates to a method and device for image encoding/decoding, and a recording medium storing a bitstream. More particularly, the present invention relates to a method and device for image encoding/decoding which performs intra-prediction using a function, and a recording medium storing a bitstream generated by the image encoding method or device of the present invention.

BACKGROUND ART

Recently, demands for high-resolution and high-quality images, such as high-definition (HD) and ultrahigh-definition (UHD) images, have increased in various fields of application. As image data has higher resolution and higher quality, the amount of data increases relative to existing image data. Accordingly, when image data is transmitted using media such as existing wired and wireless broad band lines or is stored in existing storage media, transmission cost and storage cost increase. In order to solve these problems occurring with an increase in resolution and quality of video data, high-efficiency image encoding/decoding techniques are required for images with high-resolution and high-quality.

Image compression technology include various techniques, such as an inter-prediction technique of predicting pixel values included in a current picture from previous or subsequent pictures of a current picture, an intra-prediction technique of predicting pixel values included in a current picture using pixel information in the current picture, and an entropy encoding technique of assigning a short code to a value with a high occurrence frequency and assigning a long code to a value with a low occurrence frequency. Image data may be effectively compressed and transmitted or stored using such image compression techniques.

DISCLOSURE

Technical Problem

An objective of the present invention is to provide an image encoding/decoding method and device with improved compression efficiency.

In addition, another objective of the present invention is to provide an image encoding/decoding method and device which performs intra-prediction using a function.

In addition, still another objective of the present invention is to provide a recording medium storing a bitstream generated by the image encoding method or device of the present invention.

Technical Solution

An image decoding method according to the present invention includes: decoding a prediction mode index; determining whether or not the prediction mode index indicates function-based intra-prediction; when the prediction mode index indicates function-based intra-prediction, deriving a parameter for generating a function; generating the function on the basis of the derived parameter; and performing intra-prediction by using the generated function.

Advantageous Effects

According to the present invention, an image encoding/decoding method and device with improved compression efficiency can be provided.

In addition, according to the present invention, an image encoding/decoding method and device which performs intra-prediction using a function can be provided.

In addition, according to the present invention, a recording medium storing a bitstream generated by the image encoding method or device of the present invention can be provided.

DESCRIPTION OF DRAWINGS

FIG. 5 is a view showing an embodiment of assigning an index to a mode used for intra-prediction.

FIG. 6 is a view showing an embodiment of index information of an intra-prediction mode corresponding to a second operation classification.

MODE FOR INVENTION

Figure 1:
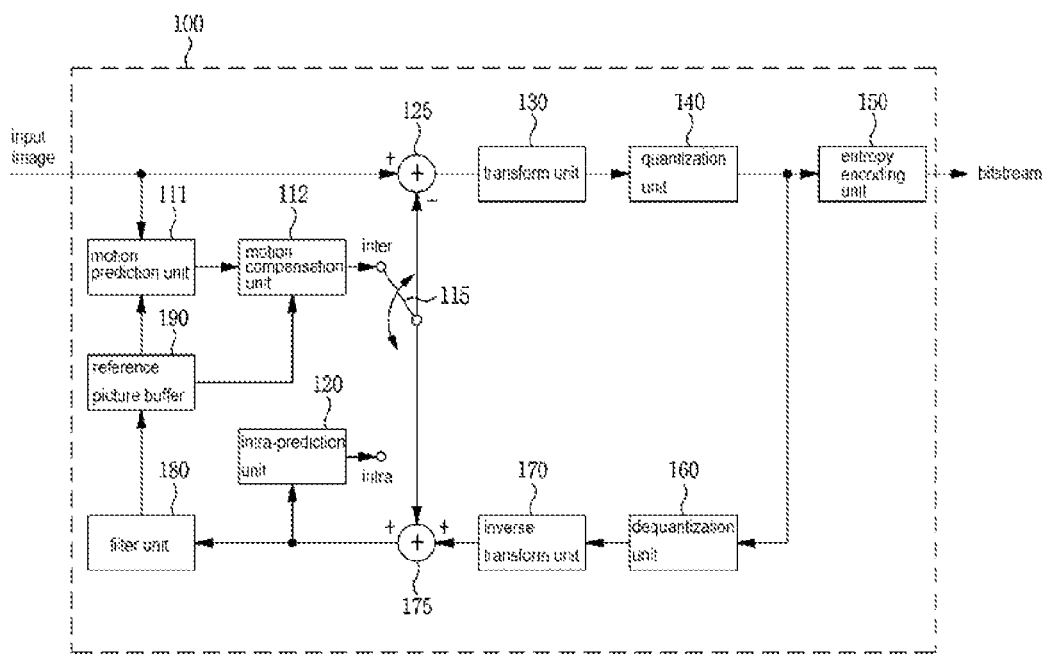
FIG. 1 is a block diagram showing a configuration of an encoding device according to an embodiment to which the present invention is applied.

Since a variety of modifications may be made to the present invention and there are various embodiments of the present invention, examples will now be provided with reference to drawings and will be described in detail. However, the present invention is not limited thereto, and the exemplary embodiments can be construed as including all modifications, equivalents, or substitutes in a technical concept and a technical scope of the present invention. In the drawings, the similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range equivalent to what the claims claim.

Terms used in the specification, "first", "second", etc. can be used to describe various components, but the components are not to be construed as being limited to the terms. The terms are only used to differentiate one component from other components. For example, the "first" component may be named the "second" component without departing from the scope of the present invention and the "second" component may also be similarly named the "first" component. The term "and/or" includes a combination of a plurality of items or any one of a plurality of terms.

When an element is mentioned to be "coupled" or "connected" to another element, this may mean that it is directly coupled or connected to the other element, but it is to be understood that yet another element may exist in-between. On the other hand, when an element is mentioned to be "directly coupled" or "directly connected" to another element, it is to be understood that there are no other elements in-between.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc., are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a single picture constituting a video, and represent a video itself. For example, "image encoding decoding or both" may mean "video encoding or decoding or both", or may mean "performing encoding or decoding or both for a single image among images constituting a video". Herein, a picture may have a meaning identical to an image.

Terms Description

Encoder: means a device performing encoding.

Decoder: means a device performing decoding.

Block: is an M×N array of sample. Herein, M and N may mean a positive integer value, and the block may mean a sample array of a two-dimensional form. The block may mean a unit. A current block may mean an encoding target block that becomes a target when performing encoding, and a decoding target block that becomes a target when performing decoding. In addition, the current block may be at least one of a coding block, a prediction block, a residual block, and a transform block.

Sample: is a basic unit constituting a block. The sample may be represented from 0 to $2^{Bd}-1$ according to a bit depth $B_d$. In the present invention, the sample may be used as a meaning of a pixel.

Unit: means an image encoding and decoding unit. When performing image encoding and decoding, the unit may be an area obtained by partitioning a single image. In addition, the unit may mean a partition unit when performing encoding or decoding by partitioning a single image into sub-units. When performing image encoding and decoding, a predefined process may be performed for each unit. A single unit may be further divided into a low level unit having a size smaller than the single unit. According to a function, the unit may mean a block, a macroblock, a coding tree unit, a coding tree block, a coding unit, a coding block, a prediction unit, a prediction block, a residual unit, a residual block, a transform unit, a transform block, etc. In addition, the unit may mean a luma component block and a chroma component block in association thereto so as to distinguish with a block, and may mean including a syntax component for each block. The unit may have various sizes and shapes. Particularly, the shape of the unit may include a rectangle, as well as a geometrical figure that is represented in a two-dimension such as, a square, a trapezoid, a triangle, a pentagon, etc. In addition, unit information may include at least one of a unit type indicating a coding unit, a prediction unit, a residual unit, a transform unit, etc., a unit size, a unit depth, and an encoding and decoding order of a unit.

Coding tree unit: configured with a single luma component (Y) coding tree block and related two chroma component (Cb, Cr) coding tree blocks. In addition, the coding tree unit may mean including all the above blocks and a syntax component of each block. Each coding tree unit may be divided by using at least one of quad tree and binary tree partitions so as to configure a low level unit such as a coding unit, a prediction unit, a transform unit, etc. The coding tree unit may be used as a term for designating a pixel block that becomes a processing unit when performing image encoding/decoding such as partitioning an input image.

Coding tree block: may be used as a term for designating any one of a Y coding tree block, a Cb coding tree block, and a Cr coding tree block.

Neighbor block: means a block adjacent to a current block. A block adjacent to a current block may mean a block where a boundary thereof is in contact with the current block, or a block positioned within a predetermined distance from the current block. The neighbor block may mean a block adjacent to a vertex of a current block. Herein, a block adjacent to a vertex of a current block may be a block vertically adjacent to a block that is horizontally adjacent to the current block, or a block horizontally adjacent to a block that is vertically adjacent to the current block. The neighbor block may mean a reconstructed neighbor block.

Reconstructed neighbor block: means a neighbor block that is spatially/temporally adjacent to a current block, and which has been already encoded or decoded. Herein, the reconstructed neighbor block may mean a reconstructed neighbor unit. A spatially reconstructed neighbor block may be a block within a current picture, and which has been already reconstructed by performing encoding or decoding or both. A temporally reconstructed neighbor block is a reconstructed block at a position identical to a current block of a current picture within a reference picture or a block adjacent thereto.

Unit depth (depth): means a degree where a unit is partitioned. In a tree structure, a root node may be a highest node, and a leaf node may be a lowest node. In addition, when representing a unit in a tree structure, a level where the unit is present may mean a unit depth.

Bitstream: may mean a bit string including encoded image information.

Parameter set: corresponds to header information of a structure within a bitstream. At least one of a video parameter set, a sequence parameter set, a picture parameter set, and an adaptation parameter set may be included in the parameter set. In addition, the parameter set may include information of a slice header and a tile header.

Parsing: may mean determining a value of a syntax element by decoding a bitstream, or may mean entropy decoding itself.

Symbol: may mean at least one of a syntax element of an encoding/decoding target unit, a coding parameter, a value of a transform coefficient, etc. In addition, the symbol may mean an entropy encoding target or a result of entropy decoding.

Prediction unit: may mean a basic unit when performing inter-prediction, intra-prediction, inter-compensation, intra-compensation, and motion compensation. A single prediction unit may be partitioned into a plurality of partitions having a small size or into a low level prediction unit.

Prediction unit partition: means a shape where a prediction unit is partitioned.

Transform unit: means a basic unit when performing encoding/decoding for a residual signal such as transform, inverse transform, quantization, dequantization, transform coefficient encoding/decoding. A single transform unit may be partitioned into a plurality of transform units having a small size.

Scaling: may mean a process of multiplying a factor to a transform coefficient level. As a result of performing scaling for a transform coefficient level, a transform coefficient may be generated. The scaling may be also referred to as dequantization.

Quantization parameter: may mean a value used for generating a transform coefficient level for a transform coefficient during quantization. Alternatively, a quantization parameter may mean a value used for generating a transform coefficient by performing scaling for a transform coefficient level during dequantization. The quantization parameter may be a value mapped to a step size of the quantization.

Residual quantization parameter (delta quantization parameter): means a residual value between a predicted quantization parameter and a quantization parameter of an encoding/decoding target unit.

Scan: means a method of sorting coefficient orders within a block or a matrix. For example, sorting a two-dimensional matrix into a one-dimensional matrix is referred to as scanning. Alternatively, sorting a one-dimensional matrix into a two-dimensional matrix may be referred to as scanning or inverse scanning.

Transform coefficient: means a coefficient value generated after performing transform in the encoder. Alternatively, a transform coefficient may mean a coefficient value generated after performing at least one of entropy decoding and dequantization in the decoder. A quantized level or quantized transform coefficient level which is obtained by applying quantization to the transform coefficient or to a residual signal may be included in the transform coefficient.

Quantized level: means a value generated by performing quantization for a transform coefficient or residual signal in the encoder. Alternatively, the quantization level may mean a value that becomes a target of dequantization before performing dequantization in the decoder. Similarly, a quantized transform coefficient level that is a result of transform and quantization may be included in a meaning of the quantized level.

Non-zero transform coefficient: means a transform coefficient having a size value other than 0, or a transform coefficient level having a size value other than 0.

Quantization matrix: means a matrix used in quantization or dequantization so as to improve subjective or objective image quality. The quantization matrix may be referred to as a scaling list.

Quantization matrix coefficient: means each element with a quantization matrix. The quantization matrix coefficient may be referred to as a matrix coefficient.

Default matrix: means a quantization matrix predetermined in the encoder and the decoder.

Non-default matrix: means a quantization matrix that is not predetermined in the encoder and the decoder, and which is signaled by a user.

FIG. 1 is a block diagram showing a configuration of an encoding device according to an embodiment to which the present invention is applied.

The encoding device 100 may be an encoder, a video encoding device or an image encoding device. A video may include at least one image. The encoding device 100 may sequentially encode at least one image.

Referring to FIG. 1, the encoding device 100 may include: a motion prediction unit 111; a motion compensation unit 112; an intra-prediction unit 120; a switch 115; a subtractor 125; a transform unit 130; a quantization unit 140; an entropy encoding 150; a dequantization unit 160; an inverse transform unit 170; an adder 175; a filter unit 180; and a reference picture buffer 190.

The encoding device 100 may perform encoding for an input image by using an intra or inter or both modes. In addition, the encoding device 100 may generate a bitstream by encoding the input image, and output the generated bitstream. The generated bitstream may be stored in a computer readable recording medium, or may be streamed through a wired/wireless transmission medium. When an intra-mode is used as a prediction mode, the switch 115 may be switched to intra, and when an inter-mode is used as a prediction mode, the switch 115 may be switched to inter. Herein, the intra-mode may mean an intra-prediction mode, and the inter-mode may mean an inter-prediction mode. The encoding device 100 may generate a prediction block for an input block of the input image. In addition, the encoding device 100 may encode the input block and a residual of the prediction block after generating the prediction block. The input image may be referred to as a current image that is a current encoding target. The input block may be referred to as a current block or an encoding target block which is a current encoding target.

When a prediction mode is an intra-mode, the intra-prediction unit 120 may use a pixel value of a block adjacent to a current block and which has been already encoded/decoded as a reference pixel. The intra-prediction unit 120 may perform spatial prediction by using a reference pixel, and generate prediction samples of an input block by performing spatial prediction. Herein, the intra-prediction may mean intra-prediction.

When a prediction mode is an inter-mode, the motion prediction unit 111 may search for an area that best matches with an input image in a reference image during motion prediction, and derive a motion vector by using the found area. A reference image may be stored in the reference picture buffer 190.

The motion compensation unit 112 may generate a prediction block by performing motion compensation using a motion vector. Herein, inter-prediction may mean inter-prediction or motion compensation.

The motion prediction unit 111 and the motion compensation unit 112 may generate a prediction block by applying an interpolation filter to a partial area within a reference image when a value of a motion vector is not an integer value. In order to perform inter-prediction or motion compensation, whether a method of performing inter-prediction and motion compensation for a prediction unit included in a corresponding coding unit is a skip mode, a merge mode, an advanced motion vector prediction (AMVP) mode, or is a current picture reference mode may be determined on the basis of a coding unit, and inter-prediction or motion compensation may be performed for each mode.

The subtractor 125 may generate a residual block by using residuals between an input block and a prediction block. The residual block may be referred to as a residual signal. A residual signal may mean a difference between an original signal and a prediction signal. Alternatively, a residual signal may be a signal generated by performing transform or quantization or transform and quantization for the difference between the original signal and the prediction signal. A residual block may be a residual signal of a block unit.

The transform unit 130 may generate a transform coefficient by performing transform for a residual block, and output the transform coefficient. Herein, the transform coefficient may be a coefficient value generated by performing transform for the residual block. In a transform skip mode, the transform unit 130 may skip the transform of the residual block.

A quantized level may be generated by applying quantization to a transform coefficient or residual signal. Hereinafter, in embodiments, a quantized level may be referred to as a transform coefficient.

The quantization unit 140 may generate a quantized level by performing quantization for a transform coefficient or residual signal according to a quantization parameter, and output the quantized level. Herein, the quantization unit 140 may perform quantization for a transform coefficient by using a quantization matrix.

The entropy encoding 150 may generate a bitstream by performing entropy encoding for values calculated in the quantization unit 140 or for a coding parameter calculated during encoding according to a probability distribution, and output the bitstream. The entropy encoding 150 may perform entropy encoding for information related to an image pixel, and information of image decoding. For example, information for image decoding may include a syntax element, etc.

When entropy encoding is applied, a symbol is represented by assigning a short bit to a symbol having a high occurrence frequency, and by assigning a long bit to a symbol having a low occurrence frequency, thus a bitstream size of symbols to be encoded may be decreased. The entropy encoding 150 may use an encoding method such as exponential Golomb, context-adaptive variable length coding (CAVLC), context-adaptive binary arithmetic coding (CABAC), etc. for entropy encoding. For example, the entropy encoding 150 may perform entropy encoding by using a variable length coding/code (VLC) table. In addition, the entropy encoding unit 150 may derive a binarization method of a target symbol and a probability model of the target symbol/bin, and perform arithmetic coding by using the derived binarization method or the derived probability model thereafter.

In order to encode a transform coefficient level, the entropy encoding unit 150 may change a two-dimensional block form coefficient into a one-dimensional vector form by using a transform coefficient scanning method.

A coding parameter may mean information (flag, index, etc.) such as syntax element which is encoded in the encoder and signaled to the decoder, as well as, may include information derived during encoding or decoding, and mean information required when performing image encoding or decoding. For example, the coding parameter may include at least one of a unit/block size, a unit/block depth, unit/block partition information, a unit/block partition structure, whether or not a quad-tree partition form is used, whether or not a binary-tree partition form is used, a partition direction of a binary-tree form (horizontal direction or vertical direction), a partition form of a binary-tree form (symmetrical partition or asymmetrical partition), an intra-prediction mode/direction, a reference sample filtering method, a prediction block filtering method, a prediction block filter tap, a prediction block filter coefficient, an inter-prediction mode, motion information, a motion vector, a reference image index, an inter-prediction direction, an inter-prediction indicator, a reference image list, a reference image, a motion vector prediction candidate, a motion vector candidate list, whether or not a merge mode is used, a merge candidate, a merge candidate list, whether or not a skip mode is used, an interpolation filter type, an interpolation filter tap, an interpolation filter coefficient, a motion vector size, a motion vector representation accuracy, a transform type, a transform size, information of whether or not primary transform is used, information of whether or not secondary transform is used, a primary transform index, a secondary transform index, information of whether or not a residual signal is present, a coded block pattern, a coded block flag, a quantization parameter, a quantization matrix, whether or not an in-loop filter is applied, an in-loop filter coefficient, an in-loop filter tap, an in-loop filter shape/form, whether or not a deblocking filter is applied, a deblocking filter coefficient, a deblocking filter tap, a deblocking filter strength, a deblocking filter shape/form, whether or not an adaptive sample offset is applied, an adaptive sample offset value, an adaptive sample offset category, and an adaptive sample offset type, whether or not an adaptive in-loop filter is applied, an adaptive in-loop filter coefficient, an adaptive in-loop filter tap, an adaptive in-loop filter shape/form, a binarization/debinarization method, a context model determining method, a context model updating method, whether or not a regular mode is performed, whether or not a bypass mode is performed, a context bin, a bypass bin, a transform coefficient, a transform coefficient level, a transform coefficient level scanning method, an image display/output order, slice identification information, a slice type, slice partition information, tile identification information, a tile type, tile partition information, a picture type, a bit depth, and information of a luma signal or chroma signal, and a combination thereof.

Herein, signaling a flag or index may mean that the corresponding flag or index is included in a bitstream by being entropy encoded in the encoder, and may mean that the corresponding flag or index is entropy decoded from a bitstream in the decoder.

When the encoding device 100 performs encoding by using inter-prediction, an encoded current image may be used as a reference image for another image that is processed later. Accordingly, the encoding device 100 may reconstruct or decode the encoded current image, or may store the reconstructed or decoded image as a reference image.

A quantized level may become dequantized in the dequantization unit 160, and may be inverse transformed in the inverse transform unit 170. A coefficient that is dequantized or inverse transformed or both may be added with a prediction block through the adder 175. A reconstructed block may be generated by adding the coefficient that is dequantized or inverse transformed or both and the prediction block. Herein, the coefficient that is dequantized or inverse transformed or both may mean a coefficient for which at least one of dequantization and inverse transform is performed, and may mean a reconstructed residual block.

A reconstructed block may pass the filter unit 180. The filter unit 180 may apply at least one of a deblocking filter, a sample adaptive offset (SAO), and an adaptive loop filter (ALF) to a reconstructed block or reconstructed image. The filter unit 180 may be referred to as an in-loop filter.

A deblocking filter may remove a block distortion occurring in boundaries between blocks. In order to determine whether or not to perform a deblocking filter, whether or not to apply a deblocking filter to a current block may be determined on the basis of pixels included in some rows or columns included in a block. When a deblocking filter is applied to a block, filters different from each other may be applied according to required deblocking filtering strength.

By using a sample adaptive offset, a proper offset value may be added to a pixel value so as to compensate a coding error. A sample adaptive offset may correct an offset with an original image in a pixel unit for an image for which deblocking is performed. A method may be used where pixels included in an image are divided into a predetermined number of areas, an area to which an offset is applied is determined, and an offset is applied to the corresponding area or a method may be used where an offset is applied by taking into account of edge information of each pixel.

An adaptive loop filter may perform filtering on the basis of a value obtained by comparing a reconstructed image and an original image. Pixels included in an image may be divided into a predetermined number of groups, a filter that will be applied to each group may be determined, thus different filtering may be performed for each group. Information related whether or not to apply an adaptive loop filter may be signaled for each coding unit (CU), and a shape and a filter coefficient of an adaptive loop filter that will be applied may vary according to each block.

Figure 2:
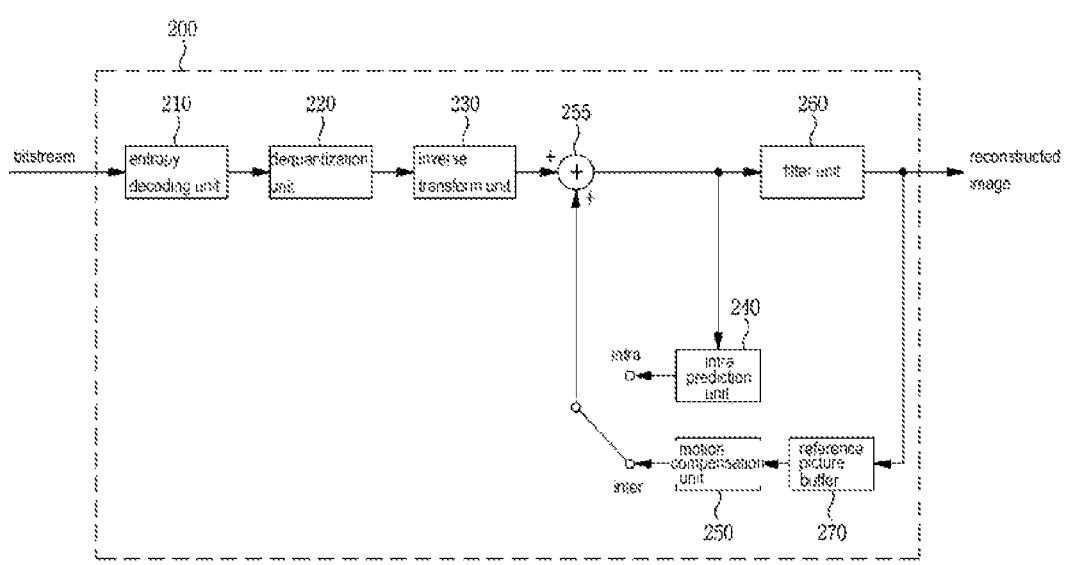
FIG. 2 is a block diagram showing a configuration of a decoding device according to an embodiment to which the present invention is applied.

A reconstructed block or reconstructed image that has passed the filter unit 180 may be stored in the reference picture buffer 190. FIG. 2 is a block diagram showing a configuration of a decoding device according to an embodiment to which the present invention is applied.

The decoding device 200 may be a decoder, a video decoding device, or an image decoding device.

Referring to FIG. 2, the decoding device 200 may include: an entropy decoding unit 210; a dequantization unit 220; an inverse transform unit 230; an intra-prediction unit 240; a motion compensation unit 250; an adder 255; a filter unit 260, and a reference picture buffer 270.

The decoding device 200 may receive a bitstream output from the encoding device 100. The decoding device 200 may receive a bitstream stored in a computer readable recording medium, or may receive a bitstream streamed through a wired/wireless transmission medium. The decoding device 200 may perform decoding for a bitstream by using an intra-mode or inter-mode. In addition, the decoding device 200 may generate a reconstructed image or decoded image through decoding, and output the reconstructed image or decoded image.

When a prediction mode used in decoding is an intra-mode, the switch is switched to intra. When a prediction mode used for decoding is an inter-mode, the switch is switched to inter.

The decoding device 200 may obtain a reconstructed residual block by decoding an input bitstream, and generate a prediction block. When a reconstructed residual block and a prediction block are obtained, the decoding device 200 may generate a reconstructed block that becomes a decoding target by adding the reconstructed residual block and the prediction block. A decoding target block may be referred to as a current block.

The entropy decoding unit 210 may generate symbols by performing entropy decoding for a bitstream according to a probability distribution. The generated symbols may include a symbol having a quantized level form. Herein, an entropy decoding method may be a process inverse to the above-mentioned entropy encoding method.

In order to decode a transform coefficient level, the entropy decoding unit 210 may change a one-dimensional vector form coefficient into a two-dimensional block form by using a transform coefficient scanning method.

A quantized level may be dequantized in the dequantization unit 220, and may be inverse transformed in the inverse transform unit 230. The quantized level may be a result of dequantization or inverse transform or both, and may be generated as a reconstructed residual block. Herein, the dequantization unit 220 may apply a quantization matrix to the quantized level.

When an intra-mode is used, the intra-prediction unit 240 may generate a prediction block by performing spatial prediction using a pixel value adjacent to a decoding target block and which has been already decoded.

When an inter-mode is used, the motion compensation unit 250 may generate a prediction block by performing motion compensation using a motion vector and a reference image that is stored in the reference picture buffer 270. The motion compensation unit 250 may generate a prediction block by applying an interpolation filter to a partial area within a reference image when a value of a motion vector is not an integer value. In order to perform motion compensation, whether a motion compensation method of a prediction unit included in a coding unit is a skip mode, a merge mode, an AMVP mode, or a current picture reference mode may be determined on the basis of the coding unit, and motion compensation may be performed for each mode.

The adder 255 may generate a reconstructed block by adding a reconstructed residual block and a prediction block. The filter unit 260 may apply at least one a deblocking filter, a sample adaptive offset, and an adaptive loop filter to a reconstructed block or reconstructed image. The filter unit 260 may output a reconstructed image. A reconstructed block or reconstructed image may be used for inter-prediction by being stored in the reference picture buffer 270.

Figure 3:
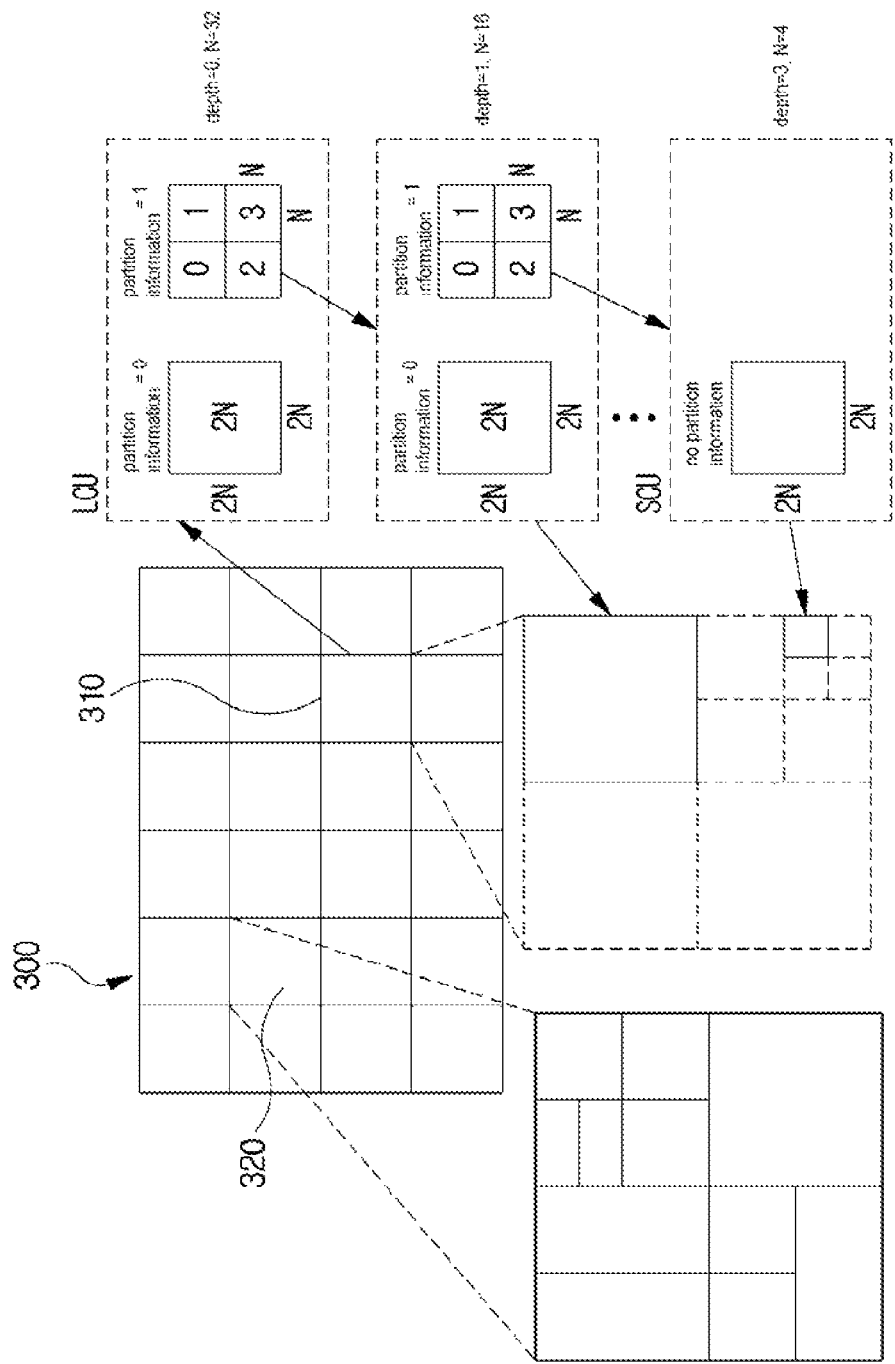
FIG. 3 is a view schematically showing an image partition structure when encoding and decoding an image.

FIG. 3 is a view schematically showing an image partition structure when encoding and decoding an image. FIG. 3 schematically shows an example where a single unit is partitioned into a plurality of low level units.

In order to efficiently partition an image, a code unit (CU) may be used when encoding and decoding. A coding unit may be used as a basic unit for image encoding/decoding. In addition, a coding unit may be used as a unit where an intra-mode and an inter-mode are divided when performing image encoding/decoding. A coding unit may be a basic unit used for prediction, transform, quantization, inverse transform, dequantization, or encoding/decoding a transform coefficient.

Referring to FIG. 3, an image 300 is sequentially partitioned into a largest coding unit (LCU), and a partition structure is determined in a LCU unit. Herein, an LCU may be used to have the same meaning with a coding tree unit (CTU). Unit partition may mean partitioning a block corresponding to the unit. Block partition information may include information of a unit depth. Depth information may represent a number of times or degrees or both where a unit is partitioned. A single unit may be hierarchically partitioned on the basis of a tree structure and with depth information. Each of a low level partitioned unit may have depth information. Depth information may be information representing a CU size, and may be stored for each CU.

A partition structure may mean a distribution of a coding unit (CU) within an LCU 310. Such a distribution may be determined by whether or not to partition a single CU into a plurality of CUs (a positive integer including 2, 4, 8, 16, etc.). A horizontal size and a vertical size of a CU generated by partition may be a half of a horizontal size and a vertical size of a CU before partition, respectively, or may have a horizontal size and a vertical size which are smaller than a horizontal size and a vertical size of a CU before partition according to a number of CUs. A CU may be recursively partitioned into a plurality of CUs. CU partition may be recursively performed up to a predefined depth or predefined size. For example, a depth of an LCU may be 0, a depth of a smallest coding unit (SCU) may be a predefined maximum depth. Herein, the LCU may be a coding unit having a largest coding unit size as described above, and the SCU may be a coding unit having a smallest coding unit size. Partition starts from the LCU 310, when a horizontal size or a vertical size or both of a CU is decreased by partition, a depth of the CU is increased by 1.

In addition, information of whether a CU is partitioned may be represented through CU partition information. Partition information may be information of 1-bit. All CUs may include partition information except for an SCU. For example, when a value of partition information is a first value, a CU may not be partitioned, and when a value of partition information is a second value, a CU may be partitioned.

Referring to FIG. 3, an LCU having a depth of 0 may be a 64×64 block. 0 may be a minimum depth. An SCU having a depth of 3 may be an 8×8 block. 3 may be a maximum depth. A CU of a 32×32 block and a 16×16 block may be represented as a depth 1 and a depth 2, respectively.

For example, when a single coding unit is partitioned into four coding units, a horizontal size and a vertical size of four coding units may be a half of a horizontal size and a vertical size of the coding unit before the partition. In an example, when a coding unit of a 32×32 size is partitioned into four coding units, each of the four coding unit may have a 16×16 size. When a single coding unit is partitioned into four coding units, the same may mean that the coding unit is partitioned into a quad-tree form.

For example, when a single coding unit is partitioned into two coding units, a horizontal size or a vertical size of two coding units may be a half of a horizontal size or a vertical size of the coding unit before the partition. In an example, when a coding unit of a 32×32 size is vertically partitioned into two coding units, each of the two coding unit may have a 16×32 size. When a single coding unit is partitioned into two coding units, the same may mean that the coding unit is partitioned into a binary-tree form. An LCU 320 of FIG. 3 is an example where a quad-tree form partition and a binary-tree form partition are applied to an LCU.

Figure 4:
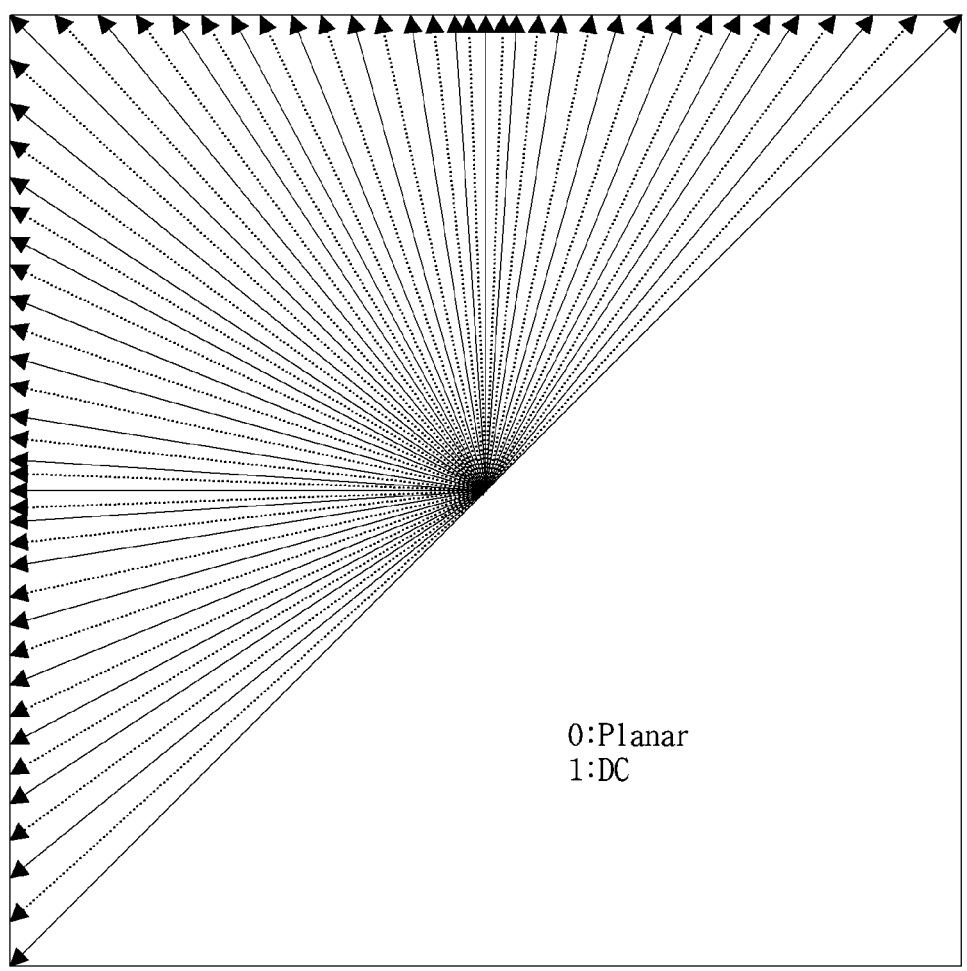
FIG. 4 is a view showing an example of intra-prediction.

FIG. 4 is a view showing an example of intra-prediction.

An intra-prediction mode may be a non-directional mode or directional mode. A non-directional mode may be a DC mode or Planar mode, and a directional mode (angular mode) may be a prediction mode having a specific direction or angle. The intra-prediction mode may be represented in at least one of a mode number, a mode value, a mode figure, and a mode angle. A number of intra-prediction modes may be at least M including the non-directional and directional modes.

A number of intra-prediction modes may be fixed to N regardless of a size of a block. Alternatively, a number of intra-prediction modes may vary according to a block size or a type of color component or both. For example, when a block size becomes large, a number of intra-prediction modes may become large. Alternatively, a number of intra-prediction modes of a luma component block may be greater than a number of intra-prediction modes of a chroma component block.

In order to perform intra-prediction for a current block, determining whether or not samples included in a reconstructed adjacent block is usable as a reference sample of the current block may be performed. When a sample that is not usable as a reference sample of a current block is present, the sample may be used as a reference sample of the current block by replacing the value of the sample that is not usable as a reference sample with a sample value obtained by performing copying or interpolation or both at least one sample value included in the reconstructed adjacent block.

When performing intra-prediction, a filter may be applied to at least one of a reference sample, and a prediction sample on the basis of at least one of an intra-prediction mode, and a size of a current block.

In case of a Planar mode, when generating a prediction block of a current block, according to a position of a prediction target sample within a prediction block, a sample value of the prediction target sample may be generated by performing weighted sum for upper and left reference samples of the current sample, and right-upper and left-lower reference samples of the current block. In addition, in case of a DC mode, when generating a prediction block of a current block, an average value of upper and left reference samples of the current block may be used. In addition, in case of a directional mode, a prediction block may be generated by using at least one of upper, left, right-upper, and left-lower reference samples of the current block. In order to generate a prediction sample value, interpolation in a real number unit may be performed.

An intra-prediction mode of a current block may be entropy encoded/decoded by performing prediction by using an intra-prediction mode of a block present adjacent to the current block. When intra-prediction modes of the current block and the neighbor block are identical, information indicating that intra-prediction modes of the current block and the neighbor block are identical may be signaled by using predetermined flag information. In addition, among a plurality of intra-prediction modes of a neighbor block, indicator information representing an intra-prediction mode identical to an intra-prediction mode of the current block may be signaled. When the current block differs in an intra-prediction mode with the neighbor block, intra-prediction mode information of the current block may be entropy encoded/decoded by performing entropy encoding/decoding on the basis of an intra-prediction mode of the neighbor block.

Hereinafter, a method and device for decreasing an intra-prediction error by performing function-based intra-prediction will be described.

Intra-prediction used in image compression degrades in compression efficiency since the same generates a larger prediction error than inter-prediction. Particularly, when a target sample of intra-prediction is far away from a reference sample used in prediction, a prediction error becomes large. In intra-prediction, when samples within a prediction target block have different features with a direction of a prediction mode selected within the target block, prediction accuracy may be degraded since prediction samples are generated by using extrapolation using external reference samples of the block to be predicted on the basis of a direction of the selected intra-prediction mode.

A function that may be used in the present invention may be at least one of a normal function, a Laplacian function, a cosine function, a beta function, an exponential function, a lognormal function, a gamma function, a Pareto function, a uniform function, a triangular function, and a logistic function, but types of functions is not limited thereto. In addition, the function may be determined through an original image, or may be determined through parameters obtained from a reference sample. Alternatively, a function may be determined by being approximated from at least one reference sample.

According to the present invention, a prediction sample of a current block may be generated by using a predetermined function. For example, intra-prediction according to the present invention may be performed by using a normal function of Formula 1.

$$f(x) = c \exp\left(-\frac{(x-a)^2}{b}\right) \quad \text{[Formula 1]}$$

The Formula 1 is a single variable normal distribution function that may be generated through a reference sample. In the Formula 1, x is positional information of the reference sample, and a means an average value of the normal distribution function and is positional information where a peak value of the normal distribution is present. b means a deviation value in the normal distribution, and is information representing a degree of spread of the normal distribution. c means an amplitude of the normal distribution.

Approximation process of the single variable normal distribution of the Formula 1 may be represented as Formulas 3 to 6 by performing approximation to each reference sample.

Formula 2 is an integral equation using normal distribution integration principle. Two integral terms of the corresponding integral equation may be approximated as recurrence formulas of Formulas 3 and 4, respectively.

$$\begin{cases} f(x) - f(x_1) = A \int_{x_1}^{x} f(t)dt + B \int_{x_1}^{x} tf(t)dt \\ \text{with: } A = \frac{\mu}{\sigma}\sqrt{\frac{2}{\pi}} \text{ and } B = -\frac{1}{\sigma}\sqrt{\frac{2}{\pi}} \end{cases} \quad \text{[Formula 2]}$$

$$\begin{cases} S_1 = 0 \\ S_k = S_{k-1} + \frac{1}{2}(r_k + r_{k-1})(x_k - x_{k-1}) \ k = 2 \rightarrow n \end{cases} \quad \text{[Formula 3]}$$

$$\begin{cases} T_1 = 0 \\ T_k = T_{k-1} + \frac{1}{2}(x_k r_k + x_{k-1} r_{k-1})(x_k - x_{k-1}) \ k = 2 \rightarrow n \end{cases} \quad \text{[Formula 4]}$$

In the Formula 3, S may be a recurrence formula of the term $A\int_{x_1}^{x} f(t)dt$. In Formula 4, T may be a recurrence formula of the term $B\int_{x_1}^{x} tf(t)dt$. In the Formula, $r_k$ may be a reference sample value. Herein, k means an order of the reference sample. $x_k$ means a position of a k-th reference sample. In case of a reference sample, k and $x_k$ may be the same value since a value of $x_k$ is an integer value.

A and B may be represented as Formula 5 when a formula is generated where an error is minimized on the basis of recurrence formulas of Formulas 3 and 4.

$$\binom{A}{B} = \begin{pmatrix} \Sigma(S_k)^2 & \Sigma S_k T_k \\ \Sigma S_k T_k & \Sigma(T_k)^2 \end{pmatrix}^{-1} \binom{\Sigma(r_k - r_1)S_k}{\Sigma(r_k - r_1)T_k} \quad \text{[Formula 5]}$$

a, b, and c may be calculated by using Formula 6 below on the basis of A and B calculated by using Formula 5.

$$a = -\frac{A}{B}; b = -\frac{2}{B}; c = \frac{\Sigma r_k}{\Sigma \exp\left(\frac{-(x_k - a)^2}{b}\right)} \quad \text{[Formula 6]}$$

Values obtained by performing approximation for an upper reference sample and a left reference sample are substituted for Formula 1 on the basis of Formulas 5 and 6. A bivariate function may be derived by performing convolution of two formulas in Formula 1.

As a result, a prediction sample may be generated and used on the basis of the function according to positions x and y of the prediction sample as Formula 7. In Formula 7, x and y mean positional information in a two-dimensional block.

$$p_d = f(x, y) = \sqrt{c_{Top} \times c_{Left}} \exp\left(-\left(\frac{(x - a_{Top})^2}{b_{Top}} + \frac{(y - a_{Left})^2}{b_{Left}}\right)\right) \quad \text{[Formula 7]}$$

Operation of function-based intra-prediction may be described by classifying the same into three cases. When the three cases are defined as a first operational classification, a second operational classification, and a third operational classification, respectively, the first operational classification is a case where function-based intra-prediction is used in intra-prediction encoding. Operation of the first operational classification is as follows.

The intra-prediction unit 120 of FIG. 1 may perform prediction on the basis of a function by generating a single function or a plurality of functions. Herein, the encoder may select any one of a plurality of usable functions. As a method of selecting one function, a function where a rate-distortion cost becomes minimum may be selected. A parameter required for defining a function for each function type may be determined. A reference sample may be used when determining the parameter. Alternatively, an encoding target image may be used. Alternatively, the entire or a partial area of an image that has been already encoded may be used.

FIG. 5 is a view showing an embodiment of assigning an index to a mode used for intra-prediction.

An index shown in FIG. 5 may be used for indicating a prediction mode selected for intra-prediction. Herein, the index indicating the selected prediction mode may be encoded or transmitted or both through various steps for transmitting a syntax element of a bitstream. For example, the index may be transmitted through at least one unit of a sequence parameter set (SPS), a video parameter set (VPS), a coding unit (CU), a coding tree unit (CTU), a transform unit (TU), a prediction unit (PU), a slice, and a group of pictures (GOP).

The encoder may encode an index indicating a prediction mode selected for intra-prediction, and encode a parameter(s) for determining a corresponding function. The encoder may transmit encoded information, and the decoder may receive and decode the same.

Parameters for determining a function may be classified into two groups. For a parameter(s) corresponding to a first parameter group, a corresponding parameter value may be identified in the decoder by using a reference sample that has been already received or image data that has been already reconstructed even when the same is not transmitted from the encoder to the decoder. Accordingly, the decoder may estimate (derive) a parameter(s) corresponding to the first parameter group and use the same for intra-prediction when an index indicating a prediction mode is received.

A parameter corresponding to a second parameter group is transmitted to the decoder as the encoder transmits a value thereof. Alternatively, according to an employment, the decoder estimates (derives) a function indicating an index in predetermined accuracy, and the function is accurately determined by using a parameter value belonging to the second parameter group. Herein, the decoder receives a parameter(s) corresponding to the second parameter group and uses the same for intra-prediction when an index indicating an intra-prediction mode is received.

A second operational classification may select any one mode of other intra-prediction modes (for example, directional prediction, DC or Planar or both prediction modes, etc.) other than function-based intra-prediction. Of course, herein, a prediction mode where a rate-distortion cost becomes minimum may be selected. The intra-prediction unit 120 of FIG. 1 may select a mode where a rate-distortion cost becomes minimum by comparing prediction modes such as DC, Planar, directional prediction modes, etc. and a function-based prediction mode. Herein, the function-based prediction mode may use a single function or a plurality of functions.

FIG. 6 is a view showing an embodiment of index information of an intra-prediction mode corresponding to an operation classification 2.

In case of a second operational classification, the encoder may select an intra-prediction mode where a rate-distortion cost becomes minimum. In order to search for a minimum rate-distortion cost, a rate-distortion cost may be calculated for various intra-prediction modes. In case of function-based prediction, for each available function type, a parameter(s) determining the function may be estimated (derived) by using a reference sample or input image. Herein, when a mode having a minimum cost may be determined, an index value shown in FIG. 6 may be encoded (transmitted). Herein, as described above, the index may be transmitted through at least one unit of a SPS, a VPS, a CU, a CTU, a TU, a PU, a slice, and a GOP. Description of the first parameter group corresponding to a function-based mode, and the second parameter group are the same as the first operational classification.

Figure 7:
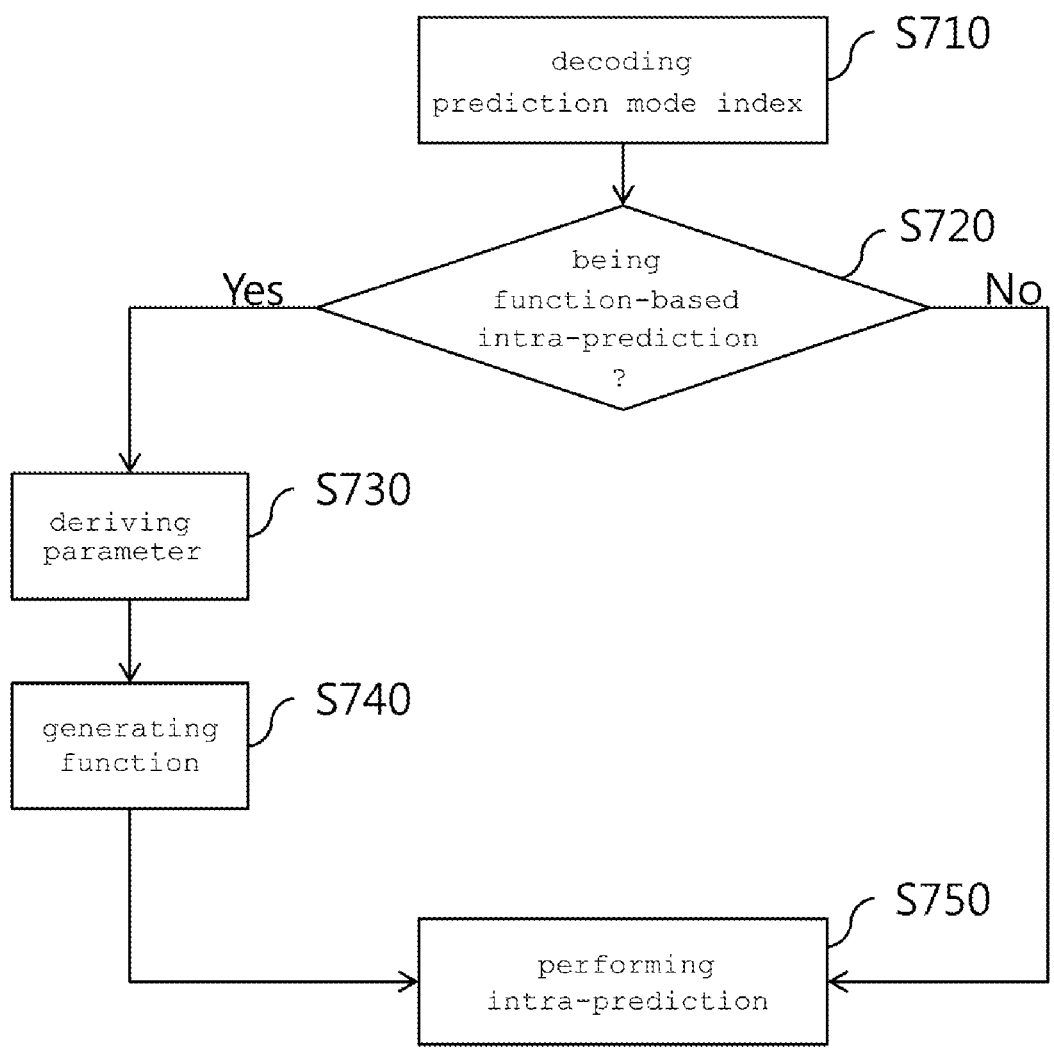
FIG. 7 is a view showing an operational embodiment of the decoder performing the second operational classification.

FIG. 7 is a view showing a second operational embodiment of the decoder performing a second operational classification.

The decoder performing a second operational classification may reconstruct a prediction error signal by receiving a bitstream, and by performing entropy decoding, inverse transform, and dequantization. A reconstructed image may be obtained by adding the reconstructed prediction error signal and a prediction sample. Herein, in S710, in order to generate a prediction sample, a prediction mode index indicating an intra-prediction method may be decoded by being transmitted from the encoder through a bitstream.

In S720, whether or not the prediction mode index indicates function-based intra-prediction may be determined.

When the prediction mode index indicates function-based intra-prediction (that is, YES in S720), in S730, a parameter of the corresponding mode may be derived. In detail, when a first parameter group is present in the prediction mode indicated by the prediction mode index, the first parameter group may be derived by using a neighbor reference sample, etc. When a second parameter group is present in the prediction mode indicated by the prediction mode index, parameter values corresponding to the second parameter group may be derived by performing parsing (decoding) of the received bitstream. In S740, a function may be generated on the basis of at least one of a parameter (first parameter group) derived on the basis of a neighbor reference sample and a parameter (second parameter group) additionally derived by parsing the bitstream, and in S750, a prediction sample may be generated by using the generated function.

When the prediction mode index does not indicate function-based intra-prediction (that is, NO in S720), in S750, a prediction sample may be generated by performing intra-prediction on the basis of at least one of DC, Planar, and directional (angular) prediction modes.

In case of a second operational classification, as described above, an intra-prediction mode that will be used for decoding may be identified by using a prediction mode index indicating one of DC, Planar, directional prediction modes, and a function-based prediction mode. However, it is not limited thereto, a single function or a plurality of functions may be used by signaling a predetermined piece of information (for example, FBIP_flag). FBIP_flag (function based intra-prediction flag) may be information indicating whether or not to perform function-based intra-prediction according to the present invention.

The encoder may transmit FBIP_flag to the decoder through a bitstream by encoding the same, and the decoder may receive FBIP_flag from the bitstream.

Figure 8:
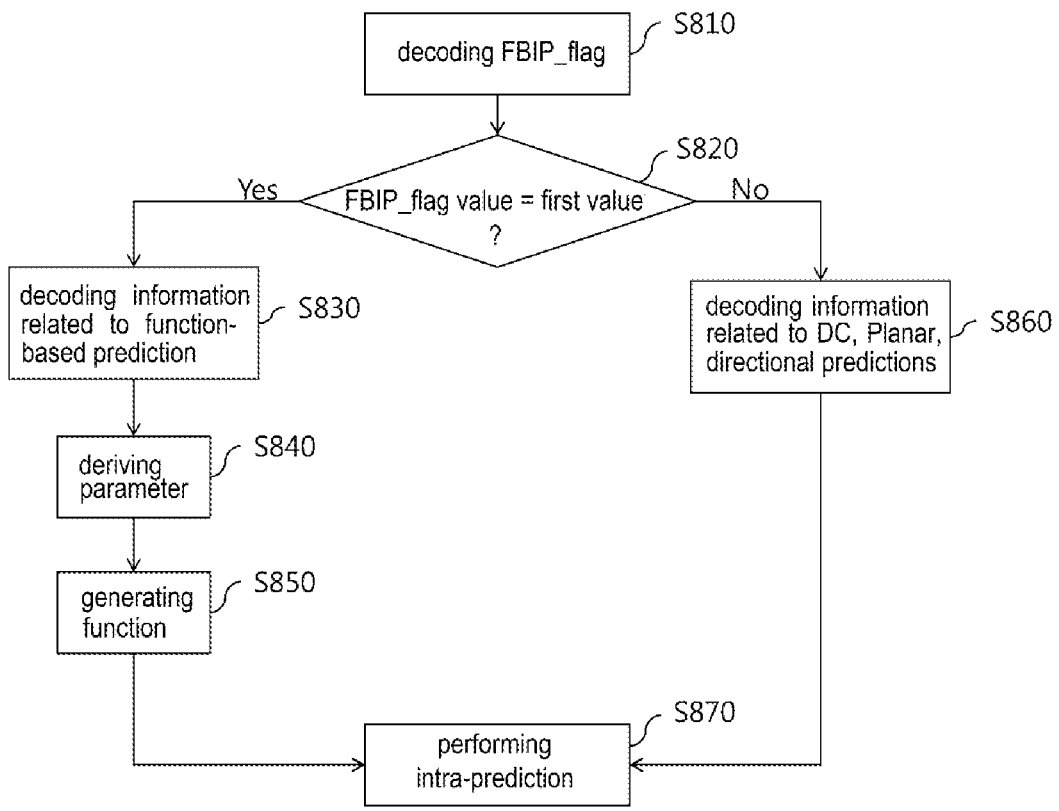
FIG. 8 is a view showing another operational embodiment of the decoder performing the second operational classification.

FIG. 8 is a view showing another operational embodiment of the decoder performing a second operational classification.

In S810, FBIP_flag may be decoded from a bitstream. In S820, a value of FBIP_flag may be checked. When a value of FBIP_flag is a first value, in S830, the decoder may not perform parsing for prediction mode information such as DC, Planar, directional prediction, etc., and decode from the bitstream function-based prediction mode information and information related thereto (for example, information of a parameter value corresponding to a second parameter group). In addition, in S840, the decoder may derive a parameter(s) corresponding to a first parameter group by using a neighbor reference sample, and derive a parameter(s) corresponding to a second parameter group on the basis of information obtained by additionally parsing the bitstream. In S850, a function may be generated by using the derived parameter(s) corresponding to the first parameter group and the second parameter group, and in S870, a prediction sample may be generated by using the generated function. The first value may be, for example, 1.

When a value of FBIP_flag is a second value, in S860, the decoder may perform parsing for prediction mode information such as DC, Planar, directional predictions, etc., and, in S870, perform intra-prediction by using one method indicated by the parsed prediction mode such as DC, Planar, directional predictions, etc. The second value may be, for example, 0.

In case of a third operational classification, a prediction sample generated by prediction modes such as DC, Planar, directional predictions, etc. may be corrected by using additional information obtained through a function-based prediction mode. The intra-prediction unit 120 of FIG. 1 may perform correction by using a prediction mode such as DC, Planar, directional predictions, etc. and additional information obtained through function-based intra-prediction. The correction may be employed through weighted sum or weighted multiplication. Herein, function-based intra-prediction may use a single function or a plurality of functions.

The encoder performing the third operational classification may select an intra-prediction mode where a rate-distortion cost becomes minimum. A rate-distortion cost may be calculated by using a prediction sample generated through a prediction mode such as DC, Planar, directional predictions, etc. and by using a prediction sample generated by performing function-based correction. When function-based prediction is used as a correction mode, FBIP_flag may be transmitted by being determined as a first value (for example, 1). When a function-based correction mode is not used, FBIP_flag may be transmitted by being determined as a second value (for example, 0).

When a cost becomes minimum when function-based prediction is used as a correction mode, FBIP_flag may be encoded by being determined as 1. Herein, an index shown in FIG. 5 may be transmitted. Herein, as described above, the index may be transmitted through at least one unit of a SPS, a VPS, a CU, a CTU, a TU, a PU, a slice, and a GOP. Description of the first parameter group corresponding to a function-based mode, and the second parameter group are the same as the first operational classification.

Figure 9:
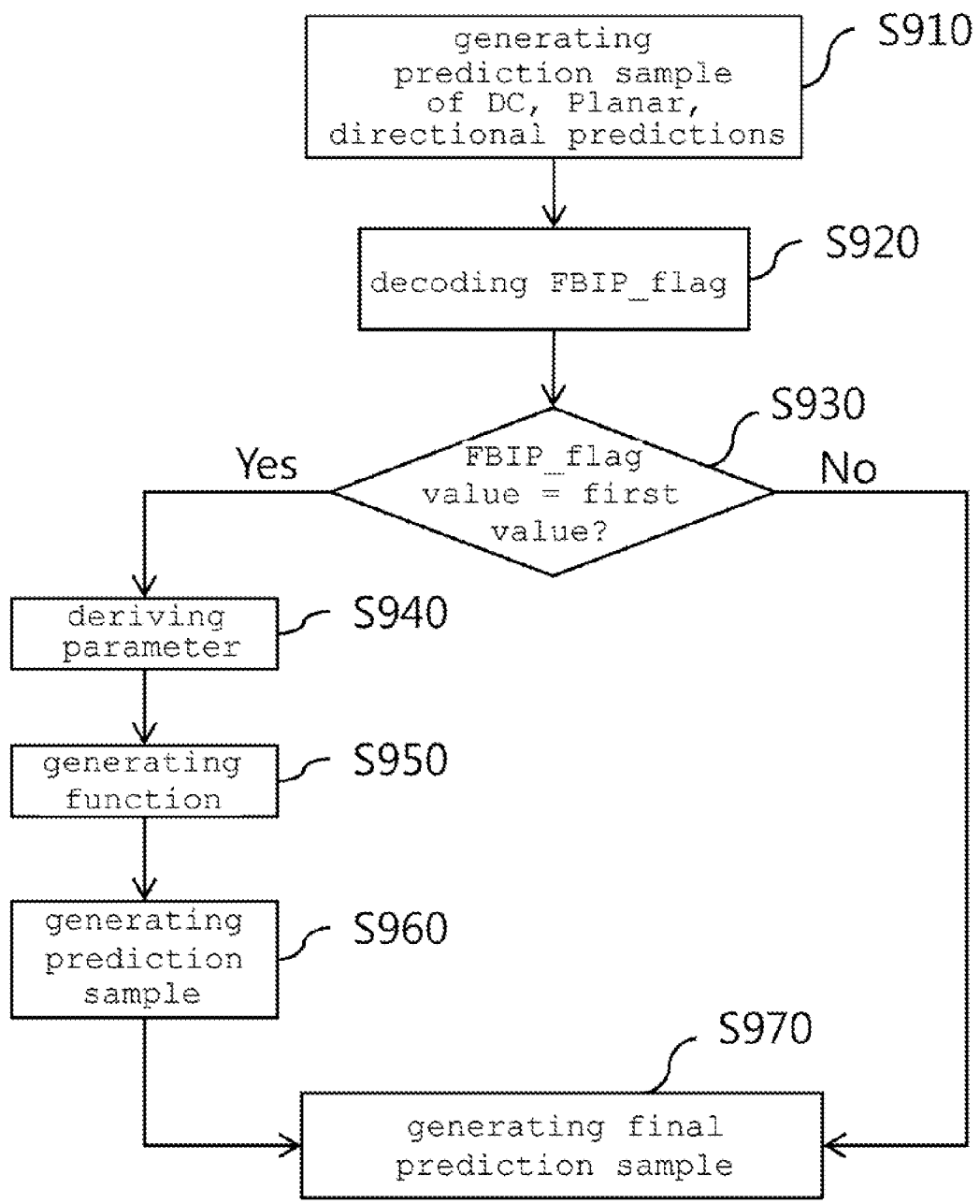
FIG. 9 is a view showing an operational embodiment of the decoder performing a third operational classification.

FIG. 9 is a view showing an operational embodiment of the decoder performing a third operational classification.

The decoder performing a third operational classification may reconstruct a prediction error signal by receiving a bitstream and by performing entropy decoding, inverse transform, and dequantization. A reconstructed image may be obtained by adding the reconstructed prediction error signal and a prediction sample.

In S910, the decoder may generate a prediction sample on the basis of a prediction mode such as DC, Planar, directional predictions, etc. Subsequently, in S920, FBIP_flag may be decoded from a bitstream, when a value of FBIP_flag is a second value (for example, 0) (NO in S930), in S970, the generated prediction sample may be determined as a final prediction sample without any additional step.

When a value of FBIP_flag is a first value (for example, 1) (YES in S930s), and a first parameter group corresponding to the selected function-based prediction mode is present, a parameter value corresponding to the first parameter group may be derived by using a neighbor reference sample. In addition, in S940, when a second parameter group corresponding to the selected function-based prediction mode is present, parameter values corresponding to the second parameter group may be decoded from a bitstream. In S950, a function may be generated on the basis of at least one of a parameter (first parameter group) obtained from a neighbor reference sample, and a parameter (second parameter group) additionally derived from the bitstream by parsing the same, and in S960, a prediction sample may be generated by using the generated function.

Finally, in S970, a final prediction sample may be generated by performing weighted sum or weighed multiplication for a prediction sample (prediction sample generated in S910) generated through a prediction mode such as DC, Planar, directional predictions, etc., and a prediction sample (prediction sample generated in S960) generated through a function-based prediction mode.

Alternatively, an offset sample may be generated by using a function generated through at least one of the first parameter group, and the second parameter group. A final prediction sample may be generated by adding/subtracting the offset sample to/from a prediction sample generated through a prediction mode such as DC, Planar, directional predictions, etc. Alternatively, a final prediction sample may be generated by using both of a prediction sample generated on the basis of the above-mentioned function-based prediction mode, and the offset sample.

A method of calculating weighted sum according to a third operational classification may be performed on the basis of Formula 8 below.

$$P'=(1-\alpha)P+\alpha P_d \qquad \text{[Formula 8]}$$

In the Formula 8, P' may mean a prediction sample generated by weighted sum, P may mean a prediction sample generated by DC, Planar, directional predictions, etc., $P_d$ may mean a function-based prediction sample, and α may mean a weighting factor.

A method of multiplying a weighting factor according to a third operational classification may be performed on the basis of Formula 9 below.

$$P'=\alpha P \qquad \text{[Formula 9]}$$

In the Formula 9, P' may mean a prediction sample generated by multiplying a weighting factor, P may mean a prediction sample generated by DC, Planar, directional predictions, etc., a may mean a function-based weighting factor. In other words, a method of multiplying a weighting factor is a method of multiplying a prediction sample generated by a prediction mode such as DC, Planar, directional predictions, etc., and a function-based weighting factor. Herein, for example, when calculating a normal distribution function-based weighting factor, c of Formula 6 which represents an amplitude may be used as $$c = \frac{1}{a\sqrt{2\pi}}.$$

A parameter of a prediction sample based on a function (for example, normal distribution function) may be predicted by using a reference sample adjacent to a current block (for example, PU). A parameter of a function-based prediction sample may be predicted by referencing an original signal of a current block. In order to generate a prediction sample of a current block, a function-based prediction sample may be used by replacing N intra-prediction modes (for example, 35 types of intra-prediction modes) predefined in the encoder/decoder.

When performing intra-prediction for a current block, a best prediction mode may be used by comparing a rate-distortion cost between an intra-prediction mode using extrapolation (for example, N intra-prediction modes predefined in the encoder/decoder) with a function-based intra-prediction mode. A result of performing weighted sum for an intra-prediction mode using extrapolation (for example, N intra-prediction modes predefined in the encoder/decoder) and a function-based intra-prediction mode of a current block may be used as a prediction sample. When generating a prediction sample of a current block on the basis of N intra-prediction modes predefined in the encoder/decoder, a predictor may be employed so as to obtain a function distribution.

Whether or not to apply a function-based intra-prediction method may be determined according to a feature of a current block. Herein, the feature may mean at least one of a size, a shape (for example, whether or not being a square, whether or not being a non-square in a horizontal/vertical direction) of a current block, a depth (for example, partition depth), whether or not a transform coefficient is present, whether or not transform is skipped, whether or not primary/secondary transform is performed, and whether being luma/chroma component. A function-based intra-prediction method may be applied to a specific component element (for example, luma component).

Whether or not to apply a function-based intra-prediction method to a current block may be derived from a block adjacent to the current block. The neighbor block may be a block adjacent to a predetermined position of the current block, and may be at least one of left-lower, left, left-upper, upper, and right-upper blocks.

Figure 10:
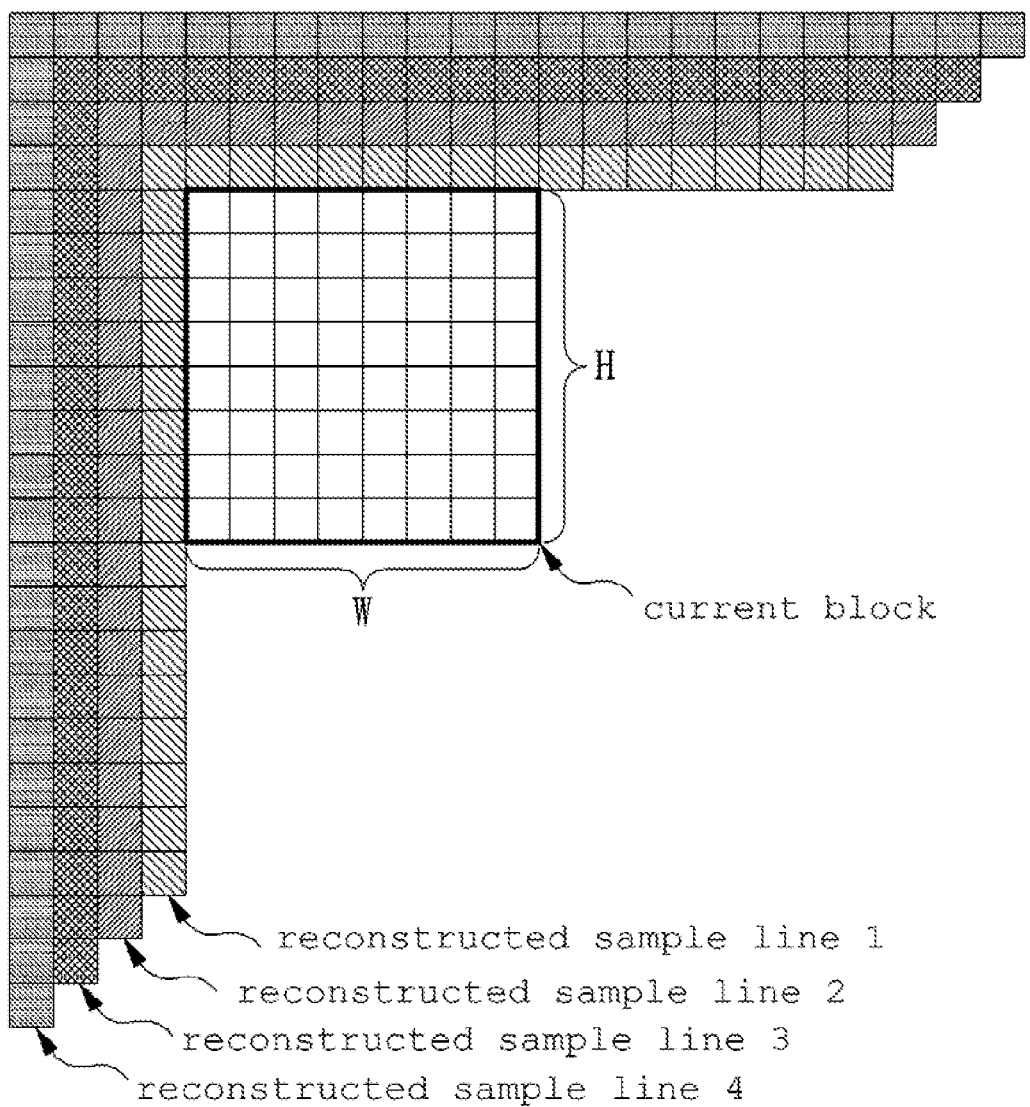
FIG. 10 is a view showing an example of neighbor reconstructed sample lines that may be used for intra-prediction of a current block.

FIG. 10 is a view showing an example of neighbor reconstructed sample lines that may be used for intra-prediction of a current block.

As shown FIG. 10, a reference sample may be configured by using at least one reconstructed sample line adjacent to a current block.

For example, one line among a plurality of reconstructed sample lines shown in FIG. 10 may be selected, and a reference sample may be configured by using the selected reconstructed sample line. As the selected reconstructed sample line, a specific line among the plurality of reconstructed sample lines may be fixedly selected. Alternatively, as the selected reconstructed sample line, a specific line among the plurality of reconstructed sample lines may be adaptively selected. Herein, an indicator for the selected reconstructed sample line may be signaled.

For example, a reference sample may be configured by using a combination of at least one reconstructed sample line among a plurality of reconstructed sample lines shown in FIG. 10. In an example, a reference sample may be configured by performing weighted sum (or weighted average) for at least one reconstructed sample. A weighting factor used in the weighted sum may be assigned on the basis of a distance from the current block. Herein, a larger weighting factor may be assigned when the current block is close. For example, Formula 10 below may be used.

$$\text{ref}[-1,-1]=(\text{rec}[-2,-1]+2*\text{rec}[-1,-1]+\text{rec}[-1,-2]+2)\\<<2$$

$$\text{ref}[x,-1]=(\text{rec}[x,-2]+3*\text{rec}[x,-1]+2)>>2, (x=0\sim WH-1)$$

$$\text{ref}[-1,y]=(\text{rec}[-2,y]+3*\text{rec}[-1,x]+2)>>2, (y=0\sim WH-1) \quad \text{[Formula 10]}$$

Alternatively, a reference sample may be configured by using at least one of an average value, a maximum value, a minimum value, a median value, a mode of a plurality of reconstructed samples on the basis of a distance from the current block or intra-prediction mode.

Alternatively, a reference sample may be configured on the basis of a variation of a plurality of consecutive reconstructed samples. For example, a reference sample may be configured on the basis of at least one of whether or not a difference between two consecutive reconstructed samples is equal to or greater than a threshold value, whether a plurality of consecutive reconstructed samples continuously varies in value or non-continuously varies in value, etc. For example, when rec [−1, −1] and rec [−2, −1] differ by more than a threshold value, ref[−1, −1] may be determined as rec[−1, −1], or may be determined a value obtained by applying weighted average that assigns a predetermined weighting factor to rec[−1, −1]. For example, when a plurality of consecutive reconstructed samples varies in value by n as the same becomes close to a current block, a reference sample may be determined as ref[−1, −1]=rec[−1, −1]−n.

At least one of a number of reconstructed sample lines, a position, and a configuration method used for the reference sample may be variably determined according to whether an upper or left boundary of a current block corresponds to at least one boundary of a picture, a slice, a tile, and a coding tree block (CTB).

For example, when configuring a reference sample by using reconstructed sample lines 1 and 2, and an upper boundary of a current block corresponds to a CTB boundary, the reconstructed sample line 1 is used for the upper of the current block, and the reconstructed sample lines 1 and 2 are used for the left of the current block.

For example, when configuring a reference sample by using reconstructed sample lines 1 to 4, and an upper boundary of a current block corresponds to a CTB boundary, the reconstructed sample lines 1 and 2 are used for the upper of the current block, and the reconstructed sample lines 1 to 4 are used for the left of the current block.

For example, when configuring a reference sample by using two reconstructed sample lines, and an upper boundary of a current block corresponds to a CTB boundary, the reconstructed sample line 1 is used for the upper of the current block, and the reconstructed sample line 2 is used for the left of the current block.

At least one reference sample may be configured by the above process.

A method of configuring a reference sample of the upper of the current block and a method of configuring a reference sample of the left of the current block may be different.

Information representing that a reference sample is configured by using at least one of the above methods may be encoded/decoded. For example, information representing whether or not a plurality of reconstructed sample lines is used may be encoded/decoded.

A reference sample of a single or a plurality of lines derived from a plurality of reference sample lines may be used as a reference sample of the present invention.

The above examples may be performed in the encoder and the decoder by using the same method.

An order of applying the above example may be differently performed in the encoder and the decoder, or an order of applying the above example may be identically performed in the encoder and the decoder.

The above example may be performed for each of luma and chroma signals, and the above example may be identically performed for luma and chroma signals.

A block shape to which the above examples of the present invention are applied may be a square or non-square.

The above examples of the present invention may be applied according to at least one size of a coding block, a prediction block, a transform block, a block, a current block, a coding unit, a prediction unit, a transform unit, a unit, and a current unit. Herein, the size may be defined as a minimum size or maximum size or both or may be defined as a fixed size so that the above example is applied. In addition, in the above examples, a first example may be applied to a first size, and a second example may be applied to a second size. In other words, the above examples may be applied in combination according to a size. In addition, the above examples of the present invention may be applied when a size is equal to or greater than a minimum size and equal to or smaller than a maximum size. In other words, the above examples may be applied when a block size is included in a predetermined range.

For example, the above examples may be applied when a size of a current block is equal to or greater than 8×8. For example, the above examples may be applied when a size of a current block is 4×4. For example, the above examples may be applied when a size of a current block is equal to or smaller than 16×16. For example, the above examples may be applied when a size of a current block is equal to or greater than 16×16 and equal to or smaller than 64×64.

The above examples of the present invention may be applied according to a temporal layer. In order to identify a temporal layer to which the above examples are applicable, an additional identifier may be signaled, and the above examples may be applied to a temporal layer specified by the corresponding identifier. Herein, the identifier may be defined to indicate a lowest layer or highest layer or both to which the above example is applicable, or may be defined to indicate a specific layer to which the above example is applicable. In addition, a fixed temporal layer to which the above example is applied may be defined.

For example, the above examples may be applied when a temporal layer of a current image is a lowest layer. For example, the above examples may be applied when an identifier of a temporal layer of a current image is equal to or greater than 1 For example, the above examples may be applied when a temporal layer of a current image is a highest layer.

A slice type to which the above examples of the present invention are applied may be defined, and the above examples of the present invention may be applied according to a slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The embodiments of the present invention described above can be implemented in the form of program instructions that can be executed through various computer components and recorded on a computer-readable recording medium. The computer-readable storage medium may include a program instruction, a data file, a data structure, and the like either alone or in combination thereof. The program instruction recorded in the computer-readable storage medium may be any program instruction particularly designed and structured for the present invention or known to those skilled in the field of computer software. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instruction include not only a mechanical language code formatted by a compiler but also a high level language code which may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention

INDUSTRIAL APPLICABILITY

The present invention may be used for image encoding/decoding.

The invention claimed is:

1. A method of decoding an image, the method comprising:
   decoding a prediction mode index of a current block;
   determining whether or not a function-based intra-prediction is performed for the current block based on the prediction mode index;
   performing intra-prediction for the current block for generating a prediction block of the current block;
   generating a residual block by decoding a bitstream; and
   reconstructing the current block based on the prediction block and the residual block,
   wherein, when the function-based intra-prediction is performed for the current block, the performing intra-prediction comprises
   deriving a parameter for generating a function; and
   performing intra-prediction by using the function based on the derived parameter,
   wherein the prediction mode index is flag information signaled through the bitstream, having a first value indicating that the function-based intra-prediction is performed or a second value indicating that the function-based intra-prediction is not performed, and
   wherein the parameter is derived using at least one among a maximum sample value and a minimum sample value of previously reconstructed reference samples neighboring the current block.

2. The method of claim 1,
   wherein the performing intra-prediction using the function is performed by inputting a reference sample value of a prediction position to the function, and
   the function outputs an intra-predicted sample value.

3. The method of claim 1,
   wherein, when the function-based intra-prediction is not performed for the current block, the performing intra-prediction comprises
   deriving an intra prediction mode; and
   performing intra-prediction based on the derived intra prediction mode.

4. The method of claim 3,
   wherein the intra prediction mode is derived by decoding prediction mode information signaled through the bitstream.

5. The method of claim 3,
   wherein the intra prediction mode indicates one among DC, Planar or directional prediction modes.

6. The method of claim 1,
   wherein the determining whether or not a function-based intra-prediction is performed for the current block is performed based on a color component of the current block.

7. The method of claim 1,
   wherein, when an upper boundary of the current block is a boundary of a coding tree block, a reference sample of intra-prediction is configured by using a first reference sample line only among a plurality of reference sample lines adjacent to the current block.

8. A method of encoding an image, the method comprising:
   determining whether or not to perform a function-based intra-prediction for the current block;
   performing intra-prediction for the current block for generating a prediction block of the current block;
   generating a residual block based on the prediction block and the current block; and
   encoding the current block by encoding the residual block into a bitstream,
   wherein, when the function-based intra-prediction is performed for the current block, the performing intra-prediction comprises
   deriving a parameter for generating a function;
   performing intra-prediction by using the function based on the derived parameter; and
   encoding a prediction mode index indicating that the function-based intra-prediction is performed for the current block,
   wherein the prediction mode index is flag information signaled through the bitstream, having a first value indicating that the function-based intra-prediction is performed or a second value indicating that the function-based intra-prediction is not performed, and
   wherein the parameter is derived using at least one among a maximum sample value and a minimum sample value of previously reconstructed reference samples neighboring the current block.

9. The method of claim 8,
   wherein the performing intra-prediction using the function is performed by inputting a reference sample value of a prediction position to the function, and
   the function outputs an intra-predicted sample value.

10. The method of claim 8,
    wherein, when the function-based intra-prediction is not performed for the current block, the performing intra-prediction comprises
    determining an intra prediction mode; and
    performing intra-prediction based on the determined intra prediction mode.

11. The method of claim 10,
    wherein the intra prediction mode is encoded as prediction mode information signaled through the bitstream.

12. The method of claim 10,
    wherein the intra prediction mode indicates one among DC, Planar or directional prediction modes.

13. The method of claim 8,
    wherein the determining whether or not to perform a function-based intra-prediction for the current block is performed based on a color component of the current block.

14. A non-transitory computer-readable recording medium storing a bitstream which is generated by a method of encoding an image, the method comprising:
    determining whether or not to perform a function-based intra-prediction for the current block;
    performing intra-prediction for the current block for generating a prediction block of the current block;
    generating a residual block based on the prediction block and the current block; and
    encoding the current block by encoding the residual block into the bitstream,
    wherein, when the function-based intra-prediction is performed for the current block, the performing intra-prediction comprises
    deriving a parameter for generating a function;
    performing intra-prediction by using the function based on the derived parameter; and
    encoding a prediction mode index indicating that the function-based intra-prediction is performed for the current block,
    wherein the prediction mode index is flag information signaled through the bitstream, having a first value indicating that the function-based intra-prediction is performed or a second value indicating that the function-based intra-prediction is not performed, and wherein the parameter is derived using at least one among a maximum sample value and a minimum sample value of previously reconstructed reference samples neighboring the current block.

* * * * *